US008478550B2

(12) United States Patent
Folken et al.

(10) Patent No.: US 8,478,550 B2
(45) Date of Patent: Jul. 2, 2013

(54) GENERATOR SET CALIBRATION CONTROLLER

(75) Inventors: Keith Ronald Folken, West Peoria, IL (US); Michael Allen Dvorsky, Peoria, IL (US); Matthew Joseph Meinhart, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 306 days.

(21) Appl. No.: 12/842,492

(22) Filed: Jul. 23, 2010

(65) Prior Publication Data
US 2012/0019000 A1    Jan. 26, 2012

(51) Int. Cl.
*H02P 9/04* (2006.01)
*G01R 35/00* (2006.01)

(52) U.S. Cl.
USPC .............................................. 702/60; 702/62

(58) Field of Classification Search
USPC ........................... 702/60, 62; 290/7; 324/130
See application file for complete search history.

(56) References Cited

U.S. PATENT DOCUMENTS

| 5,514,958 | A | 5/1996 | Germer |
| 5,592,393 | A | 1/1997 | Yalla |
| 6,262,672 | B1 | 7/2001 | Brooksby et al. |
| 6,282,104 | B1 | 8/2001 | Kern |
| 6,507,794 | B1 * | 1/2003 | Hubbard et al. ............ 702/60 |
| 6,636,028 | B2 | 10/2003 | Lavoie et al. |
| 6,735,535 | B1 | 5/2004 | Kagan et al. |
| 6,892,144 | B2 | 5/2005 | Slater et al. |
| 6,911,813 | B2 | 6/2005 | Gandhi |
| 6,975,951 | B1 | 12/2005 | Sutrave et al. |
| 6,988,043 | B1 | 1/2006 | Randall |
| 7,102,556 | B2 | 9/2006 | White |
| 7,359,809 | B2 | 4/2008 | Bruno |
| 7,521,822 | B2 | 4/2009 | Lorenz |
| 7,660,682 | B2 | 2/2010 | Slota et al. |
| 2009/0281679 | A1 * | 11/2009 | Taft et al. ..................... 700/297 |
| 2009/0287428 | A1 * | 11/2009 | Holdsclaw et al. ............ 702/57 |
| 2009/0296439 | A1 | 12/2009 | Qi et al. |
| 2010/0042262 | A1 | 2/2010 | Niezgoda et al. |

FOREIGN PATENT DOCUMENTS

| JP | 2006238690 | 9/2006 |
| JP | 4189071 | 12/2008 |
| KR | 1020100041688 | 4/2010 |

OTHER PUBLICATIONS

U.S. Appl. No. 12/482,461, filed Jul. 23, 2010.

* cited by examiner

*Primary Examiner* — Sujoy Kundu
(74) *Attorney, Agent, or Firm* — Finnegan, Henderson, Farabow, Garrett & Dunner LLP

(57) ABSTRACT

A calibration system for a generator set controller is disclosed. The calibration system may have a source of electric power, a controller in communication with the source and configured to monitor a parameter of the electric power and produce at least one output corresponding to the monitored parameter, and a power meter configured to measure the parameter of the electric power. The calibration system may also have a processor in communication with the source of electric power, the controller, and the power meter. The processor may be configured to direct electric power having a first test voltage from the source to the controller, and directly relate a value of the at least one output corresponding to the first test voltage and a value of the measured parameter to an offset error.

8 Claims, 3 Drawing Sheets

GENERATOR SET CALIBRATION CONTROLLER

TECHNICAL FIELD

The present disclosure relates generally to a calibration controller, and more particularly, to a calibration controller for a generator set.

BACKGROUND

Generator sets (gensets) are self-contained power modules that can be permanently or temporarily connected to an off-board facility, for example to a home, a hospital, or a factory, to provide primary, supplemental, and emergency backup power to one or more external loads. Cables extend from a distribution grid of the facility to the gensets and are selectively connected to the gensets by way of load interruption devices. A genset controller, typically mounted on each genset, monitors and responsively controls characteristics of electric power produced by each genset and sent to the off-board facility.

In some situations, the voltage and/or current produced by a genset may be too high for the genset controller to directly measure. In these situations, one or more current and/or voltage transformers may be used to step down the voltage and current to lower levels, which may be more readily accepted by the controller. In order for each genset to provide power having characteristics desired by a customer, each genset controller should accurately measure the stepped down and converted power and properly correlate this power to the power produced by the associated genset. Unfortunately, the different sensing components and circuitry within the controller, as well as the different transformers that provide the stepped-down power to the controller, can introduce shift, scale, and delay errors into the measurements made by the controller. Accordingly, the controller may require calibration for optimum performance.

Historically, calibration of a genset controller has been performed manually. That is, power from a genset was directed through a metering device simultaneous with readouts from a corresponding genset controller. If scale or time delay errors between the measured genset power and the controller readouts were observed on the metering device, a technician could then adjust settings of the genset controller such that the errors were reduced. Although satisfactory for some applications, this manual calibration process was time consuming and had an accuracy level too low for other applications.

A method of calibrating a power meter device is disclosed in U.S. Pat. No. 7,660,682 (the '682 patent) of Slota et al. published on Feb. 9, 2010. Specifically, the '682 patent discloses a metering device having transformers for stepping down and converting from AC to DC electrical energy in a power line, circuitry for measuring a parameter of the transformed electrical energy, a storage device for storing a calibration factor, and a processor for processing the calibration factor and adjusting the measuring of the parameter to compensate for scale and time delay errors caused by the transformers and the circuitry. In a first mode of operation, which occurs at a factory, errors generated by the circuitry are determined and calibration factors are calculated that will be used during a second mode of operation to compensate for the circuitry-generated errors. During a third mode of operation, which occurs after the circuitry is connected to the transformers at a substation, the processor applies different known voltages and/or currents to the transformers at a number of different test points and measures outputs of the circuitry. The measured outputs are compared to expected outputs and corresponding error values are determined. The processor then determines adjustments for compensating for the errors at the test points. The storage device stores the calibration factors and the adjustments, and the circuitry references and implements the stored information during parameter measuring in the second mode of operation.

Although the method of the '682 patent may be helpful when calibrating a power meter, the benefit thereof may be minimal. In particular, the method may still rely on a manual calibration process completed at a factory, which, as described above, can be time consuming and have low accuracy. In addition, the test points utilized by the processor at the substation may not be selected to provide a sufficiently accurate determination of error. Further, the method of the '682 patent makes a comparison with expected values during the third mode of operation, which can be problematic if the expected values do not properly match actual values. Finally, the method of the '682 patent may not be applicable to a genset controller.

The disclosed calibration controller is directed to overcoming one or more of the problems set forth above and/or other problems of the prior art.

SUMMARY

In one aspect, the present disclosure is directed to a calibration system for a generator set controller. The calibration system may include a source of electric power, a controller in communication with the source and configured to monitor a parameter of the electric power and produce at least one output corresponding to the monitored parameter, and a power meter configured to measure the parameter of the electric power. The calibration system may also include a processor in communication with the source of electric power, the controller, and the power meter. The processor may be configured to direct electric power having a first test voltage from the source to the controller, and directly relate a value of the at least one output corresponding to the first test voltage and a value of the measured parameter to an offset error.

In another aspect, the present disclosure is directed to a method of calibrating a genset controller. The method may include generating electric power, monitoring the electric power at a first location, and measuring the electric power at a second location. The method may further include making a first comparison of a value of the electric power monitored at the first location with a value of the electric power measured at a second location when the electric power has desired values, and determining a monitoring offset error based on the first comparison.

DETAILED DESCRIPTION

Figure 1:
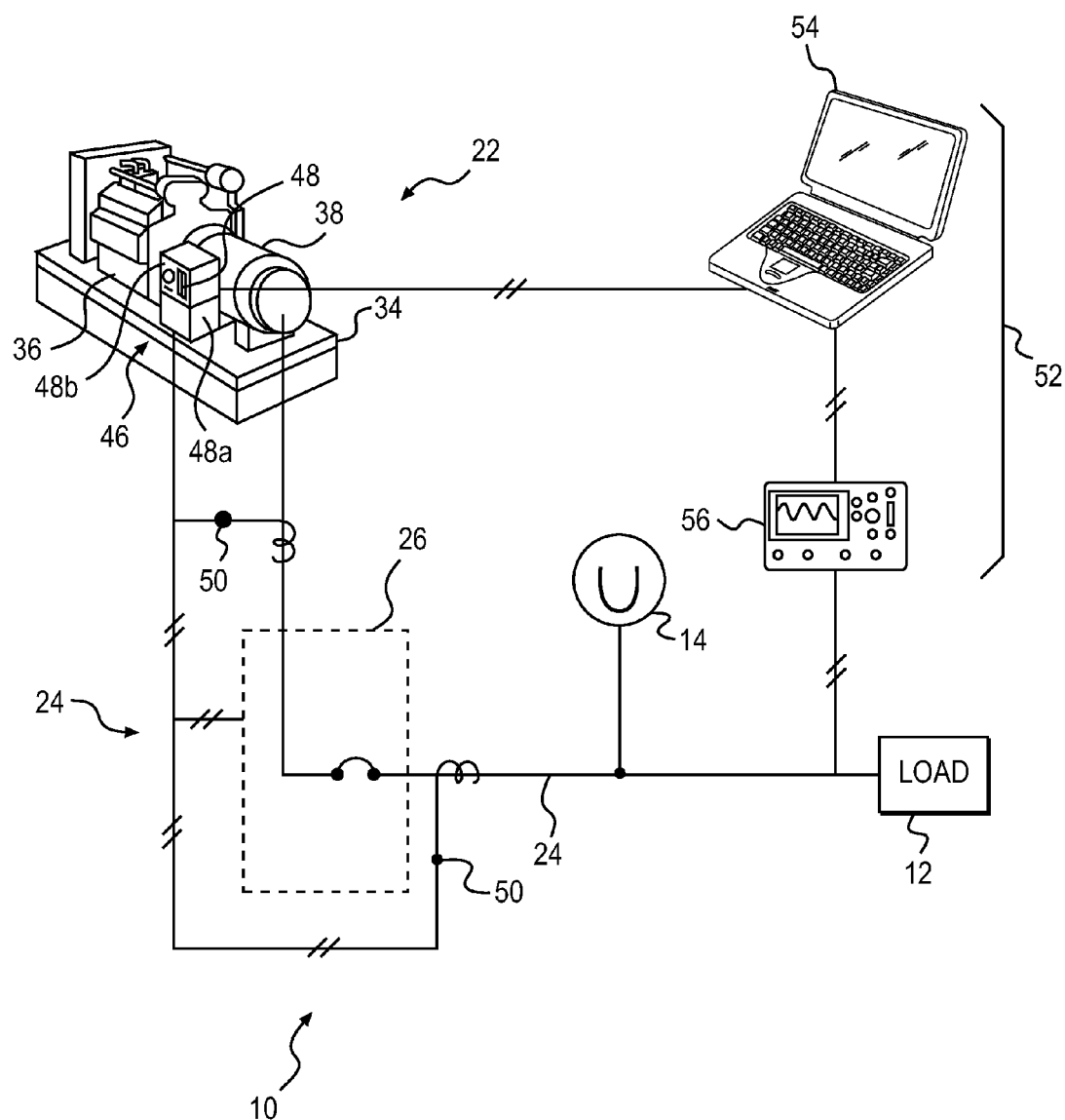
FIG. 1 is a diagrammatic illustration of an exemplary disclosed power system.

FIG. 1 illustrates an exemplary power system 10 consistent with certain disclosed embodiments. Power system 10 may include a generator set (genset) 22 and a load 12. In one exemplary embodiment, genset 22 may provide emergency backup power to load 12 when power supplied from a utility power grid 14 is interrupted. In another embodiment, genset 22 may be configured to provide primary power or temporary supplemental power, if desired. As shown in FIG. 1, genset 22 and utility power grid 14 may be connected to load 12 by way of a power transmission network 24. A connector 26 may be disposed within power transmission network 24 between genset 22 and load 12 at a location upstream of utility power grid 14 (i.e., at a location that allows genset 22 to be connected to and disconnected from load 12 without affecting a connection between utility power grid 14 and load 12.

Load 12 may include any type of power consuming system or device that is located external to and offboard of genset 22. Load 12 may receive electric power supplied by utility power grid 14 and genset 22, and utilize the electric power to perform specialized tasks. Load 12 may include, for example, lights, motors, heating elements, electronic circuitry, refrigeration devices, air conditioning units, computer servers, industrial machines, etc.

Transmission network 24 may embody any electric transmission system for distributing electric power generated by utility power grid 14 and genset 22 to load 12. For example, transmission network 24 may include a system of transmission lines, connection equipment (e.g., switch gears, transformers, power relays, and the like), and other suitable devices for distributing electric power across a grid. In one embodiment, portions of transmission network 24 may be buried underground and/or run overhead via transmission towers.

Connector 26 may include any type of device capable of coupling together genset 22, transmission network 24, and load 12. For example, connector 26 may include various transfer switches, junction boxes, breakers, fuses, load-interruption devices, or any other components that may be suitable for electrically interconnecting one or more devices and systems. Connector 26 may be manually or automatically operated to close and thereby transmit electric power or to open and thereby inhibit the transmission of electric power.

Genset 22 may be a mobile, frame-mounted unit that includes components that interact to generate electric power. Accordingly, genset 22 may comprise a frame 34, a prime mover 36 mounted to frame 34, and a generator 38 mounted to frame 34 and mechanically coupled to rotate with an output of prime mover 36. For the purposes of this disclosure, prime mover 36 is depicted and described as a heat engine, for example, a combustion engine that combusts a mixture of fuel and air to produce the rotating mechanical output. One skilled in the art will recognize that prime mover 36 may be any type of combustion engine such as a diesel engine, a gasoline engine, or a gaseous fuel-powered engine. Generator 38 may be, for example, an AC induction generator, a permanent-magnet generator, an AC synchronous generator, or a switched-reluctance generator. In one embodiment, generator 38 may include multiple pairings of poles (not shown), each pairing having three phases arranged on a circumference of a stator (not shown) to produce an alternating current with a frequency of 50 or 60 Hz. Electric power produced by generator 38 may be directed offboard genset 22 to load 12 by way of transmission network 24 and connector 26.

Genset 22 may also include a terminal box 46 mounted to frame 34 and housing a controller 48 that is in communication with prime mover 36, generator 38, and connector 26. Controller 48 may include, among other things, a memory module 48a and a processor module 48b. Processor module 48b may embody a single or multiple microprocessors, field programmable gate arrays (FPGAs), digital signal processors (DSPs), etc., that are capable of controlling operations of prime mover 36, generator 38, connector 26, and/or load 12 in response to various input. Numerous commercially available microprocessors can be configured to perform the functions of processor module 48b. It should be appreciated that processor module 48b could readily embody a microprocessor separate from those that control functions of load 12, and that processor module 48b may communicate with load microprocessors via datalinks or other methods. Various other known circuits may be associated with controller 48, including power supply circuitry, signal-conditioning circuitry, actuator driver circuitry (i.e., circuitry powering solenoids, motors, or piezo actuators), communication circuitry, and other appropriate circuitry.

According to one embodiment, controller 48 may be configured to monitor performance of power system 10 and responsively regulate operations of load 12, genset 22, transmission network 24, and/or connector 26. For example, controller 48 may monitor a current, a frequency, and/or a voltage parameter of the electric power provided by genset 22 through connector 26 to offboard load 12. In response to a value of the monitored parameter deviating from a desired value, controller 48 may generate corresponding control signals directed to load 12, connector 26, prime mover 36, and/or genset 38 that function to adjust the quality and/or the demand of the electric power. In an exemplary embodiment, one or more sensors 50 may step down the voltage and/or current of electric power from genset 22 to alternating current signals that are more acceptable for monitoring by controller 48.

Figure 2:
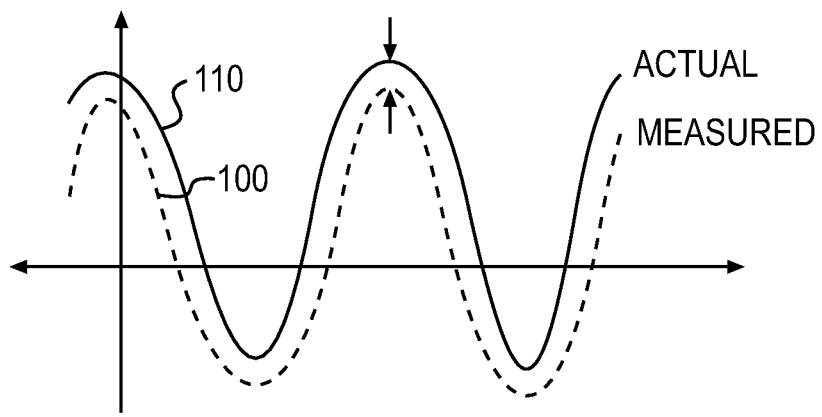
FIGS. 2-4 are graphs illustrating different possible power monitoring errors associated with the power system of FIG. 1.
Figure 3:
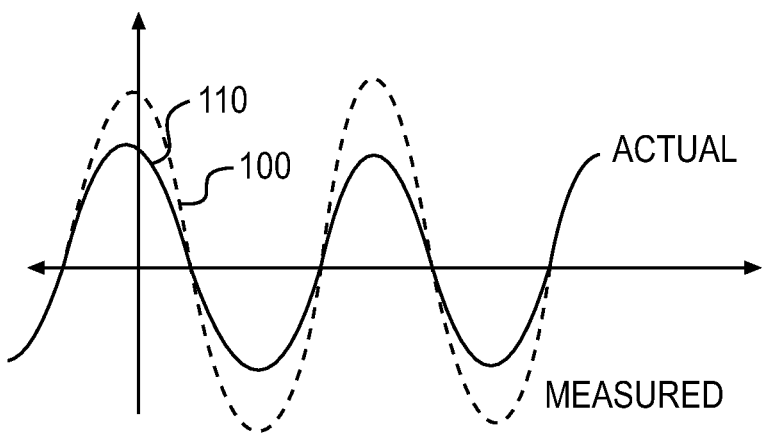
Figure 4:
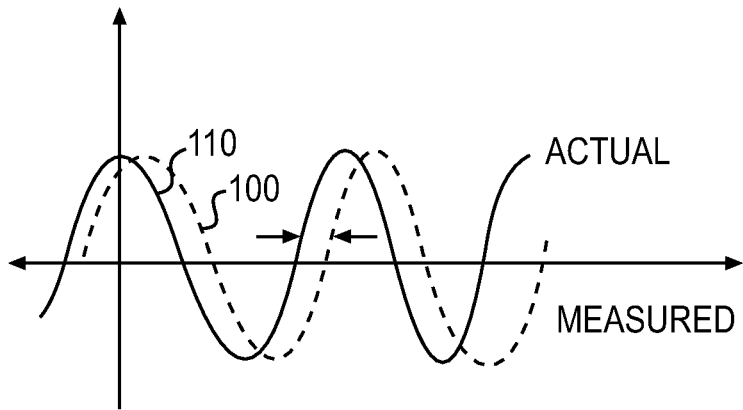

During the power transforming by sensors 50 and the monitoring of current, frequency, and/or voltage parameters by controller 48, it may be possible for errors to occur. As shown in FIGS. 2-4, these errors can include an offset error (FIG. 2), a scale error (FIG. 3), and a time delay error (FIG. 4), and be caused or influenced by hardware and/or software inefficiencies associated with any components of power system 10. The offset error may occur either when sensors 50 generate a signal indicative of a measured value (represented by a curve 100) that is consistently lower or higher than an actual value (represented by a curve 110) of the parameter being monitored, or when controller 48 incorrectly interprets the signal from sensors 50 to correspond with a consistently lower or higher value. The scale error may occur either when sensors 50 generate a signal indicative of a measured value that deviates from an actual value of the parameter by a scaled amount, or when controller 48 incorrectly interprets the signal by a scaled amount. The time delay error may occur throughout generation and/or interpretation of the signal due to inherent time lags built into the hardware and software of the power system components. The offset, scale, and time delay errors can be represented by a space between curves 100 and 110 in FIGS. 2, 3, and 4, respectively.

Power system 10 may include a calibration system 52 associated with genset 22 and load 12 that accounts for the offset, scale, and time delay errors described above. Calibration system 52 may include controller 48, sensors 50, an external processor 54, and a calibration reference meter 56. Processor 54 may embody, for example, a computer console that is hard wired to controller 48 and/or meter 56, a portable device such as a laptop computer or PDA that is selectively connected to controller 48 and/or meter 56, or a remote device that is wirelessly connected to controller 48 and/or meter 56. Meter 56 may embody, for example, a high-accuracy power meter used during calibration of controller 48 to precisely measure the current, voltage, and/or frequency of electric power and communicate signals indicative of the measured parameters to processor 54.

Processor 54 may be configured to perform a first calibration process (labeled as 200 in FIG. 5) that generates calibration factors associated with the offset error, the scale error and the time delay error. In one embodiment, the first calibration process may be performed at a factory that produces controller 48 and may be associated with calibration of controller 48 before controller 48 is connected to genset 22 and/or sensors 50, or at least before connection of genset 22 to load 12 (i.e., before closure of connector 26). The calibration factors determined during the first calibration process may be stored within memory module 48a and utilized by processor module 48b during power monitoring and/or regulation of power system 10.

Controller 48 may be configured to perform a second calibration process (labeled as 300 in FIG. 5) after synchronization of genset 22 with utility power grid 14 and connection of genset 22 to load 12 (i.e., after closer of connector 26). In one embodiment, closure of connector 26 may trigger the second calibration process. The second calibration process may be used to adjust the calibration factors determined during the first calibration process and thereby account for additional errors caused by sensors 50.

Figure 5:
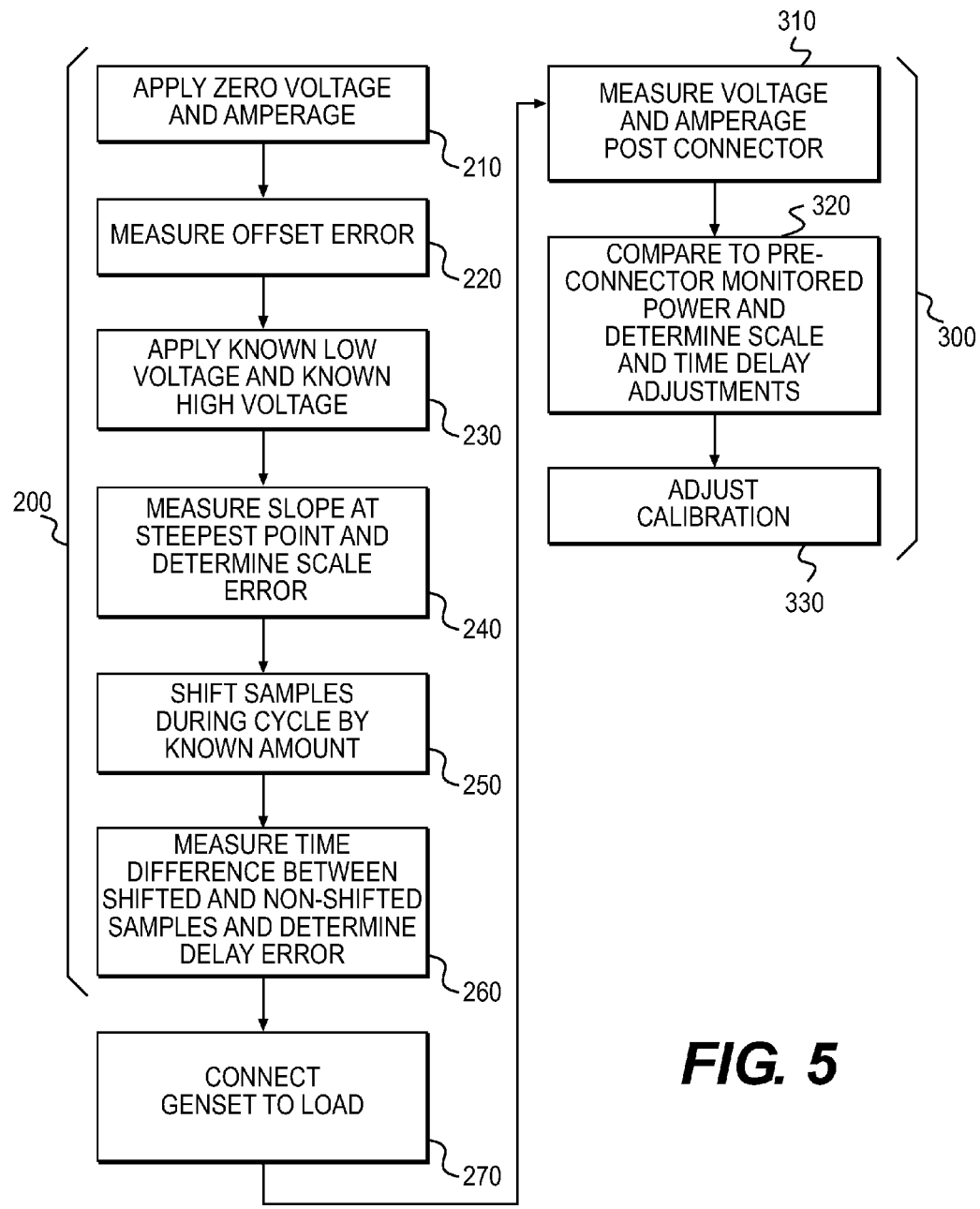
FIG. 5 is a flowchart illustrating an exemplary disclosed method of operating the power system of FIG. 1.

FIG. 5 illustrates steps of the first and second calibration processes. FIG. 5 will be discussed in more detail in the following section to further illustrate the disclosed concepts.

Industrial Applicability

The disclosed calibration controller and system may help to improve accuracy in metering of voltage and current provided by a genset to an offboard load. In particular, the disclosed calibration controller may undergo and implement different calibration processes before and after synchronization of the genset with a utility power grid and connection of the genset to the load to adjust for errors in controller monitoring. By reducing errors in monitoring, a greater precision in genset control may be achieved. FIG. 5 will be now be discussed in detail.

As described above, the first calibration process 200 may be implemented before synchronization of genset 22 with utility power grid 14 and connection of genset 22 to load 12. In one embodiment, processor 54 may implement the first calibration process 200 before controller 48 is even connected to genset 22, for example, at a factory that produces controller 48.

During the first calibration process 200, processor 54 may direct an alternating 3-phase test voltage having a desired voltage and a desired amperage to controller 48 (Step 210). In one embodiment, the desired voltage and the desired amperage may be about zero, although other values are considered. At this point in time, any output of controller 48 indicative of corresponding parameter values that deviate from the desired voltage and amperage may be related to the offset error. For example, during monitoring of power having zero current and zero amperage, any non-zero output of controller 48 may be equated to the offset error. Accordingly, processor 54 may utilize meter 56 to measure the output of controller 48, and directly relate the measured output to the offset error (Step 220). In one embodiment, the output of controller 48 corresponding with each phase of the test voltage may be independently measured and averaged, and the average output then related to the offset error. A first calibration factor corresponding to the offset error may then be stored within memory module 48a for subsequent monitoring/interpreting use by processor module 48b.

After determining the offset error and implementing the corresponding first calibration factor, processor 54 may direct an alternating 3-phase test voltage having a known high voltage level, a known low voltage level, a known high current level, and a known low current level to controller 48 (Step 230). In one embodiment, the known high voltage level may be about 277 volts, the known low voltage level may be about 0 volts, the known high current level may be about 4.5 A, and the known low current level may be about 0 A. At this point in time, controller 48 may output a sinusoidal signal for each phase of power indicative of the monitored power alternating between the high and low voltage and current levels. Processor 54 may utilize meter 56 to measure each signal at two spaced apart points on the sinusoidal signal at locations about midway between the high and low levels (i.e., at locations where a slope of the sinusoidal curves are the greatest), determine a slope between the two points, and then directly relate the slope of each signal to the scale error (Step 240). By sampling the signals at the locations of greatest slope, an accuracy of the measurement may be improved, as the values of the signals may be changing the most at this time and any error in scale may be readily apparent. If the samples were instead taken at locations of no slope (e.g., when the signals are at the high or low levels) or at locations of lesser slope, the signals may not be changing much at all and provide less of an indication of scale error. A second calibration factor corresponding to the scale error may then be stored within memory module 48a for subsequent monitoring/interpreting use by processor module 48b.

After determining the scale error and implementing the corresponding second calibration factor, processor 54 may be configured to utilize samples taken during the scale error determination to calculate the time delay error and a corresponding third calibration factor. In particular, while processor 54 is determining the scale error, samples of the output signals from controller 48 corresponding with each of the three phases of power may be taken and temporarily stored within a memory of processor 54. Processor 54 may be configured to then adjust the sample rate of controller 48 and selectively shift the buffer of waveforms by a known time delay for less than all of the samples (Step 250). In one embodiment, all but one sinusoidal signal (i.e., all but one monitored output from controller 48) may be shifted by the known time delay. Processor 54 may then be configured to compare the values of the monitored delayed signals with the value of the non-delayed signal (i.e., with the non-delayed monitoring output from controller 48) and, based on this comparison, calculate a time delay error associated with the monitoring by controller 48 and the corresponding third calibration factor utilizing one or more predetermined algorithms stored within memory module 48a (Step 260). The third calibration factor may be stored within memory module 48a for subsequent monitoring/interpreting use by processor module 48b.

After determining the three calibration factors corresponding to the offset error, the scale error, and the time delay error, controller 48, now programmed with the factors, may be connected to genset 22. Alternatively, if the first calibration was completed with controller 48 already onboard genset 22, the output of genset 22 may synchronize with utility power grid 14 and connector 26 may close to connect electric power from genset 22 with load 12 after completion of the first calibration process. Closure of connector 26 may be completed manually, or automatically by controller 48 or processor 54, if desired.

Controller 48 may initiate the second calibration process once the electric power of genset 22 has been synchronized with utility power grid 14 and connected to load 12. As described above, closure of connector 26, in one embodiment, may trigger initiation of the second calibration process. During the second calibration process, controller 48 may monitor parameter values of electric power from genset 22 (i.e., at a location upstream of connector 26) and at load 12 (i.e., at a location downstream of connector 26) by way of both sensors 50 (Step 310). Controller 48 may then compare the signals from the upstream sensors 50 with the signals from the downstream sensor 50 and, based on the comparison, determine adjustments to the scale and time delay calibration factors stored in memory module 48a (Step 320). These adjustments may account for influences external to controller 48, for example, influences of sensors 50, transmission network 24, connector 26, load 12, etc. Controller 48 may adjust the calibration factors accordingly, and store the adjusted calibration factors in memory module 48a for subsequent monitoring/interpreting use by processor module 48b (Step 330).

Several advantages may be associated with the disclosed calibration system. In particular, because the disclosed calibration system may perform both the first and second calibration processes automatically, little operator time may be required. In addition, the sample points utilized during the first and second calibration processes may be selected to improve error detection. Further, because the first and second calibration process may compare monitored values with actual values measured by a high-accuracy meter, the resulting calibration factors may function to greatly improve power monitoring and regulation.

It will be apparent to those skilled in the art that various modifications and variations can be made to the disclosed calibration system. Other embodiments will be apparent to those skilled in the art from consideration of the specification and practice of the calibration system disclosed herein. It is intended that the specification and examples be considered as exemplary only, with a true scope of the disclosure being indicated by the following claims and their equivalents.

What is claimed is:

1. A method of calibrating a genset controller, comprising:
generating electric power;
monitoring the electric power at a first location;
measuring the electric power at a second location;
making a first comparison of a value of the electric power monitored at the first location with a value of the electric power measured at a second location when the electric power has desired values;
determining a monitoring offset error based on the first comparison;
calculating a first calibration factor that accounts for the monitoring offset error;
affecting future monitoring based on the first calibration factor;
generating electric power having a known low voltage level and a known high voltage level;
making a second comparison of a value of the electric power monitored at the first location with a value of the electric power measured at a second location when the electric power has the low and high voltage levels; and
determining a monitoring scale error based on the second comparison;
wherein making a first comparison and determining a monitoring offset error are done by one or more processors.

2. The method of claim 1, wherein the desired values include a zero voltage value and a zero amperage value.

3. The method of claim 1, wherein the electric power is three phase alternating current, and determining the monitoring offset error includes determining the monitoring offset error for each of the three phases of electric power.

4. The method of claim 1, further including:
calculating a second calibration factor that accounts for the monitoring scale error; and
affecting future monitoring based on the second calibration factor.

5. The method of claim 1, wherein the electric power is sinusoidal and making the second comparison includes sampling the electric power at points about midway between the known low voltage level and the known high voltage level where a slope of the electric power is greatest.

6. The method of claim 1, wherein:
the known low voltage level is about 0 volts; and
the known high voltage level is about 277 volts.

7. The method of claim 1, wherein:
the electric power is three-phase alternating current;
monitoring the electric power includes monitoring each of the three-phases; and
the method further includes:
shifting a monitoring output corresponding with two of the three phases of electric power by a known amount; and
relating a difference between the two shifted monitoring outputs and the nonshifted monitoring output to a monitoring time delay error.

8. The method of claim 7, further including:
calculating a third calibration factor that accounts for the monitoring time delay error; and
affecting future monitoring based on the third calibration factor.

* * * * *